(12) United States Patent
Hwang et al.

(10) Patent No.: US 10,344,837 B2
(45) Date of Patent: Jul. 9, 2019

(54) VEHICLE TRANSMISSION

(71) Applicants: HYUNDAI MOTOR COMPANY, Seoul (KR); KIA Motors Corporation, Seoul (KR)

(72) Inventors: Seong Wook Hwang, Gunpo-si (KR); Hyun Sik Kwon, Seoul (KR); Ki Tae Kim, Incheon (KR); Won Min Cho, Hwaseong-si (KR); Jae Chang Kook, Hwaseong-si (KR); Seong Wook Ji, Hwaseong-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 15/837,157

(22) Filed: Dec. 11, 2017

(65) Prior Publication Data
US 2019/0078663 A1    Mar. 14, 2019

(30) Foreign Application Priority Data
Sep. 14, 2017   (KR) .................. 10-2017-0117879

(51) Int. Cl.
*F16H 3/66*    (2006.01)
(52) U.S. Cl.
CPC ..... *F16H 3/666* (2013.01); *F16H 2200/0069* (2013.01); *F16H 2200/2012* (2013.01); *F16H 2200/2046* (2013.01)

(58) Field of Classification Search
CPC ............. F16H 3/666; F16H 2200/0069; F16H 2200/2012; F16H 2200/2046; F16H 3/66
See application file for complete search history.

(56) References Cited

U.S. PATENT DOCUMENTS

2015/0267786 A1*  9/2015  Hart .................. F16H 3/663
                                                        475/275

FOREIGN PATENT DOCUMENTS

KR      20130003981 A     1/2013

* cited by examiner

*Primary Examiner* — Huan Le
(74) *Attorney, Agent, or Firm* — McDonnell Boehnen Hulbert & Berghoff LLP

(57) ABSTRACT

Disclosed is a vehicle transmission with multiple gear stages, the transmission being capable of improving fuel economy and the performance of a vehicle. The vehicle transmission includes four planetary gear sets and six friction members. A shifting operation is performed such that rotary elements of the planetary gear sets are selectively connected and disconnected by the friction members so that the speed and direction of rotation of each gear are changed. Through this shifting operation, a vehicle can drive with one of ten or more forward speed gear ratios and one or more reverse speed gear ratios.

6 Claims, 5 Drawing Sheets

FIG. 3

| GEAR | C1 | C2 | C3 | C4 | B1 | B2 | GEAR RATIO |
|---|---|---|---|---|---|---|---|
| 1 | ● | ● | | | | ● | 5.600 |
| 2 | ● | | | | ● | ● | 3.733 |
| 3 | | ● | | | ● | ● | 2.545 |
| 4 | | | | ● | ● | ● | 2.000 |
| 5 | | ● | | ● | ● | | 1.500 |
| 6 | ● | | | ● | ● | | 1.161 |
| 7 | ● | | ● | ● | | | 1.000 |
| 8 | | | ● | ● | ● | | 0.800 |
| 9 | ● | | ● | | ● | | 0.667 |
| 10 | | ● | ● | | ● | | 0.615 |
| R1 | | ● | ● | | | ● | −4.000 |

FIG. 5

| GEAR | C1 | C2 | C3 | C4 | B1 | B2 | GEAR RATIO |
|---|---|---|---|---|---|---|---|
| 1 | ● | ● | | | | ● | 4.900 |
| 2 | ● | | | | ● | ● | 3.150 |
| 3 | | ● | | | ● | ● | 2.321 |
| 4 | | | | ● | ● | ● | 1.867 |
| 5 | | ● | | ● | ● | | 1.465 |
| 6 | ● | | | ● | ● | | 1.189 |
| 7 | ● | | ● | ● | | | 1.000 |
| 8 | | | ● | ● | ● | | 0.759 |
| 9 | ● | | ● | | ● | | 0.643 |
| 10 | | ● | ● | | ● | | 0.599 |
| R1 | | ● | ● | | | ● | -4.900 |

VEHICLE TRANSMISSION

CROSS REFERENCE TO RELATED APPLICATION

The present application claims priority to Korean Patent Application No. 10-2017-0117879, filed Sep. 14, 2017, the entire contents of which is incorporated herein by reference.

BACKGROUND OF THE DISCLOSURE

Technical Field of the Disclosure

The present disclosure relates to a vehicle transmission capable of improving fuel economy and performance of a vehicle with an increased number of gear stages.

Description of the Related Art

Recent increases in oil prices have triggered vehicle companies into limitless competition to improve fuel economy of vehicles. Especially in regards to the engine of a vehicle, research has focused on weight reduction to improve fuel economy through downsizing.

On the other hand, in regards to the automatic transmission of a vehicle, there is an approach to increase the number of gear stages for improvement in fuel economy. This approach has an advantage of improving not only fuel economy but also performance of a vehicle.

However, as the number of gear stages increases, the number of parts constituting a transmission correspondingly increases, which is likely to deteriorate mountability and overall transmission efficiency and to increase raw material costs and weight of a transmission.

Therefore, to improve fuel economy by increasing the number of gear stages, it is vital to devise a gear train structure that can maximize transmission efficiency with fewer parts.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and an objective of the present disclosure is to provide a vehicle transmission that can improve fuel economy and performance of a vehicle with an increased number of gear stages.

In order to accomplish the above object, the present disclosure provides a vehicle transmission including: a first compound planetary gear set and a second compound planetary gear set, each including four or more rotary elements; and a plurality of friction members, each connected with at least one of the rotary elements of the first and second compound planetary gear sets and controlling rotation of the rotary element(s) connected thereto, wherein the first compound planetary gear set includes, as the four or more rotary element, a first rotary element selectively connected to a transmission case, a second rotary element directly connected to an input shaft, a third rotary element selectively connected to a third rotary element of the second compound planetary gear set, a fourth rotary element selectively connected to a first rotary element of the second compound planetary gear set, and a fifth rotary element selectively connected to the first rotary element of the second compound planetary gear set, and wherein the second compound planetary gear set includes, as the four or more rotary elements, a second rotary element directly connected with an output shaft, the third rotary element selectively connected to the transmission case. In addition, the second compound planetary gear set may further include a fourth rotary element selectively connected to the input shaft.

The first compound planetary gear set may include a first planetary gear set and a second planetary gear set that are, respectively, a single pinion planetary gear set and a double pinion planetary gear set and which share one carrier, wherein: the first rotary element of the first compound planetary gear set may be a first sun gear of the first planetary gear set; the second rotary element of the first compound planetary gear set may include a first carrier of the first planetary gear set and a second carrier of the second planetary gear set; the third rotary element of the first compound planetary gear set may be a first ring gear of the first planetary gear set; the fourth rotary element of the first compound planetary gear set may be a second sun gear of the second planetary gear set; and the fifth rotary element of the first compound planetary gear set may be a second ring gear of the second planetary gear set.

The second compound planetary gear set may include a third planetary gear set and a fourth planetary gear set, each of which is a single pinion gear set wherein: the first rotary element of the second compound planetary gear set may include a third sun gear of the third planetary gear set and a fourth sun gear of the fourth planetary gear set, which are directly connected with each other; the second rotary element of the second compound planetary gear set may include a third carrier of the third planetary gear set and a fourth ring gear of the fourth planetary gear set, which are directly connected with each other; the third rotary element of the second compound planetary gear set may be a third ring gear of the third planetary gear set; and the fourth rotary element of the second compound planetary gear set may be a fourth carrier of the fourth planetary gear set.

The second compound planetary gear set may include a third planetary gear and a fourth planetary gear, each of which is a single pinion planetary gear set wherein: the first rotary element of the second compound planetary gear set includes a third sun gear of the third planetary gear set and a fourth sun gear of the fourth planetary gear set, which are directly connected with each other; the second rotary element of the second compound planetary gear set is a fourth ring gear of the fourth planetary gear set; the third rotary element of the second compound planetary gear set is a third ring gear of the third planetary gear set; and the fourth rotary element of the second compound planetary gear set includes a third carrier of the third planetary gear set and a fourth carrier of the fourth planetary gear set, which are directly connected with each other.

The friction members may include: a first brake disposed between the first rotary element of the first compound planetary gear set and the transmission case; a second brake disposed between the third rotary element of the second compound planetary gear set and the transmission case; a first clutch disposed between the fifth rotary element of the first compound planetary gear set and the first rotary element of the second compound planetary gear set; a second clutch disposed between the fourth rotary element of the first compound planetary gear set and the first rotary element of the second compound planetary gear set; a third clutch disposed between the third rotary element of the first compound planetary gear set and the third rotary element of the second compound planetary gear set; and a fourth clutch disposed between the input shaft and the fourth rotary element of the second compound planetary gear set.

According to another aspect, there is provided a vehicle transmission including: a first compound planetary gear set and a second compound planetary gear set, each including four or more rotary elements; and a plurality of friction members, each connected with at least one of the rotary elements of the first and second compound planetary gear sets and controlling rotation of the rotary element(s) connected thereto, wherein as the four or more rotary elements, the first compound planetary gear set includes a first rotary element selectively connected to a transmission, a second rotary element directly connected to an input shaft, a third rotary element selectively connected to a third rotary element of the second compound planetary gear set, a fourth rotary element selectively connected to a first rotary element of the second compound planetary gear set, and a fifth rotary element selectively connected to the first rotary element of the second compound planetary gear set, and wherein as the four or more rotary elements the second compound planetary gear set includes a second rotary element directly connected with an output shaft, the third rotary element operating selectively as a fixed element, a fourth rotary element directly connected to the input shaft, and a fifth rotary element selectively connected with the output shaft.

The first compound planetary gear set may include a first planetary gear set and a second planetary gear set that are, respectively, a single pinion planetary gear set and a double pinion planetary gear set and which share one carrier, wherein: the first rotary element of the first compound planetary gear set may be a first sun gear of the first planetary gear set; the second rotary element of the first compound planetary gear set may include a first carrier of the first planetary gear set and a second carrier of the second planetary gear set; the third rotary element of the first compound planetary gear set may be a first ring gear of the first planetary gear set; the fourth rotary element of the first compound planetary gear set may be a second sun gear of the second planetary gear set; and the fifth rotary element of the first compound planetary gear set may be a second ring gear of the second planetary gear set.

The second compound planetary gear set may include a third planetary gear set and a fourth planetary gear set, each of which is a single pinion planetary gear set wherein: the first rotary element of the second compound planetary gear set mat include a third sun gear of the third planetary gear set and a fourth sun gear of the fourth planetary gear set, which are directly connected with each other; the second rotary element of the second compound planetary gear set may be a third carrier of the third planetary gear set; the third rotary element of the second compound planetary gear set may be a third ring gear of the third planetary gear set; the fourth rotary element of the second compound planetary gear set may be a fourth carrier of the fourth planetary gear set; and the fifth rotary element of the second compound planetary gear set may be a fourth ring gear of the fourth planetary gear set.

The friction members may include a first brake disposed between the first rotary element of the first compound planetary gear set and the transmission case; a second brake disposed between the third rotary element of the second compound planetary gear set and the transmission case; a first clutch disposed between the fifth rotary element of the first compound planetary gear set and the first rotary element of the second compound planetary gear set; a second clutch disposed between the fourth rotary element of the first compound planetary gear set and the first rotary element of the second compound planetary gear set; a third clutch disposed between the third rotary element of the first compound planetary gear set and the third rotary element of the second compound planetary gear set; and a fourth clutch disposed between the input shaft and the fifth rotary element of the second compound planetary gear set.

As described above, according to the present disclosure, a vehicle transmission is constructed by combining four planetary gear sets. A shifting operation is performed by changing speed and direction of rotation of gears in a manner of selectively connecting and disconnecting the rotary elements of the planetary gear sets and the friction members. Therefore, the vehicle transmission can provide ten or more forward speed gear ratios and one or more reverse speed gear ratios through this shifting operation. Therefore, the present disclosure has an effect of improving fuel economy and performance of a vehicle by implementing multiple gear stages. Furthermore, the present disclosure has an effect of improving driving comfort by using operating points in a low RPM range of an engine.

BRIEF DESCRIPTION OF THE DRAWINGS

The above and other objects, features and other advantages of the present disclosure will be more clearly understood from the following detailed description when taken in conjunction with the accompanying drawings, in which:

FIG. 3 is a table showing operation at each gear of the transmission according to the first and second embodiments of the present disclosure;

FIG. 5 is a table showing operation at each gear of the transmission according to the third embodiment of the present disclosure.

DETAILED DESCRIPTION OF THE DISCLOSURE

Hereinbelow, exemplary embodiments of the present disclosure will be described in detail with reference to the accompanying drawings.

A vehicle transmission according to one embodiment of the present disclosure mainly includes a first compound planetary gear set CPG1 and a second compound planetary gear set CPG2, each including four or more rotary elements.

Figure 1:
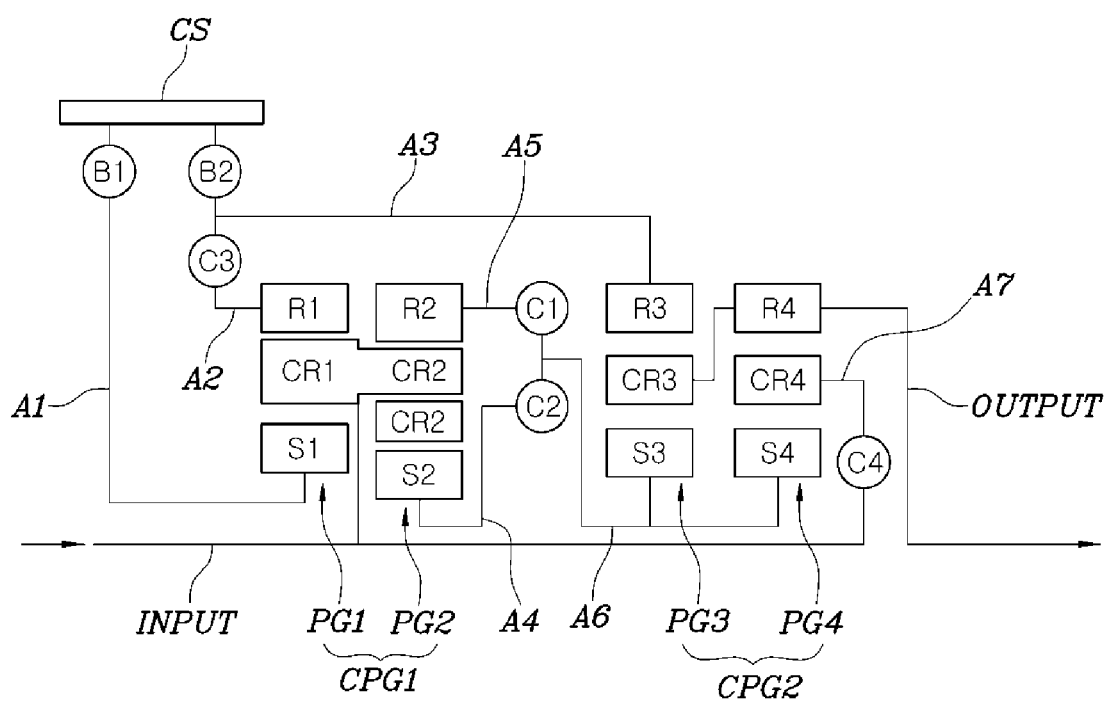
FIG. 1 is a diagram illustrating the structure of a vehicle transmission according to a first embodiment of the present disclosure.

FIG. 1 is an exemplary view illustrating the structure of a vehicle transmission according to a first embodiment of the present disclosure. With reference to FIG. 1, a first rotary element of the first compound planetary gear set CPG1 may operate selectively as a fixed element.

For example, the first rotary element of the first compound planetary gear set CPG1 may be a first sun gear S1, in which the first sun gear S1 may be selectively connected with a transmission case CS by a friction member.

The first compound planetary gear set CPG1 may include a single pinion planetary gear set and a double pinion planetary gear set that are respectively referred to as a first planetary gear set PG1 and a second planetary gear set PG2 herein. The first rotary element of the first compound planetary gear set CPG1 may be the first sun gear S1 of the first planetary gear set PG1.

In addition, a second rotary element of the first compound planetary gear set CPG1 may have a structure in which a first carrier CR1 of the first planetary gear set PG1 and a second carrier CR2 of the second planetary gear set PG2 are the shared carrier, and a third rotary element of the first compound planetary gear set CPG1 may be a first ring gear R1 of the first planetary gear set PG1.

A fourth rotary element of the first compound planetary gear set CPG1 may be a second sun gear S2 of the second planetary gear set PG2, and a fifth rotary element of the first compound planetary gear set CPG1 may be a second ring gear R2 of the second planetary gear set PG2.

The structure of the first compound planetary gear set CPG1 described above applies to a second embodiment and a third embodiment described below. Therefore, a description of the structure of the first compound planetary gear set CPG1 will be omitted hereinafter.

Referring to FIG. 1, the second rotary element of the first compound planetary gear set CPG1 may be directly connected with an input shaft INPUT. For example, the first carrier CR1 and the second carrier CR2 may be directly connected with the input shaft INPUT.

The third rotary element of the first compound planetary gear set CPG1 may be selectively connected with a third rotary element of the second compound planetary gear set CPG2.

For example, the third rotary element of the second compound planetary gear set CPG2 may be a third ring gear R3 of a third planetary gear set PG3, and the first ring gear R1 and the third ring gear R3 may be selectively connected by a friction member.

The structure of the second compound planetary gear set CPG2 will be described for understanding of connections among the rotary elements. The second compound planetary gear set CPG2 includes two single pinion gear sets that are respectively referred to as a third planetary gear set PG3 and a fourth planetary gear set PG4 herein. A first rotary element of the second compound planetary gear set CPG2 may include a third sun gear S3 of the third planetary gear set PG3 and a fourth sun gear S4 of the fourth planetary gear set PG4, which are directly connected with each other.

A second rotary element of the second compound planetary gear set CPG2 may include a third carrier CR3 of the third planetary gear set PG3 and a fourth ring gear R4 of the fourth planetary gear set PG4, which are directly connected with each other.

A third rotary element of the second compound planetary gear set CPG2 may be a third ring gear R3 of the third planetary gear set PG3, and a fourth rotary element of the second compound planetary gear set CPG2 may be a fourth carrier CR4 of the fourth planetary gear set PG4.

Still referring to FIG. 1, the fourth rotary element of the first compound planetary gear set CPG1 may be selectively connected with the first rotary element of the second compound planetary gear set CPG2.

For example, the second sun gear S2 serving as the fourth rotary element of the first compound planetary gear set CPG1 may be selectively connected with each of the second third sun gear S3 and the fourth sun gear S4 by a friction member.

The fifth rotary element of the first compound planetary gear set CPG1 may be selectively connected with the first rotary element of the second compound planetary gear set CPG2.

For example, the second ring gear R2 serving as the fifth rotary element of the first compound planetary gear set CPG1 may be selectively connected with each of the third sun gear S3 and the fourth sun gear S4 by a friction member.

The second rotary element of the second compound planetary gear set CPG2 may be directly connected with an output shaft OUTPUT.

For example, the third carrier CR3 and the fourth ring gear R4 that serve in combination as the second rotary element of the second compound planetary gear set CPG2 may be directly connected with the output shaft OUTPUT.

The third rotary element of the second compound planetary gear set CPG2 may operate selectively as a fixed element.

For example, the third ring gear R3 serving as the third rotary element of the second compound planetary gear set CPG2 may be selectively connected with the transmission case CS by a friction member.

In addition, a fourth rotary element of the second compound planetary gear set CPG2 may be selectively connected with the input shaft INPUT.

For example, the fourth carrier CR4 serving as the fourth rotary element of the second compound planetary gear set CPG2 may be selectively connected with the input shaft INPUT by a friction member.

Furthermore, in the vehicle transmission structured as described above, the first planetary gear set PG1 and the second planetary gear set PG2 that constitute the first compound planetary gear set CPG1, and the third planetary gear set PG3 and the fourth planetary gear set PG4 that constitute the second compound planetary gear set CPG2 may be arranged in this consecutive order in the axial direction of the input shaft INPUT.

The structure of the transmission according to the first embodiment of the present disclosure may further include a plurality of friction members that is connected with at least one of the rotary elements of the first and second compound planetary gear sets and which controls rotation of the rotary element(s) connected thereto. The friction members are a first brake B1, a second brake B2, a first clutch C1, a second clutch C2, a third clutch C4, and a fourth clutch C4.

Specifically, the first brake B1 may be disconnectably connected between the first sun gear S1 serving as the first rotary element of the first compound planetary gear set CPG1 and the transmission case CS.

The second brake B2 may be disconnectably connected between the third ring gear R3 serving as the third rotary element of the second compound planetary gear set CPG2 and the transmission case CS.

The first clutch C1 may be disconnectably connected between the second ring gear R2 serving as the fifth rotary element of the first compound planetary gear set CPG1 and each of the third sun gear S3 and the fourth sun gear S4 that serve in combination as the first rotary element of the second compound planetary gear set CPG2.

The second clutch C2 may be disconnectably connected between the second sun gear S2 serving as the fourth rotary element of the first compound planetary gear set CPG1 and each of the third sun gear S3 and the fourth sun gear S4 that serve in combination as the first rotary element of the second compound planetary gear set CPG2.

The third clutch C3 may be disconnectably connected between the first ring gear R1 serving as the third rotary element of the first compound planetary gear set CPG1 and the third ring gear R3 serving as the third rotary element of second compound planetary gear set CPG2.

The fourth clutch C4 may be disconnectably connected between the input shaft INPUT and the fourth carrier CR4 serving as the fourth rotary element of the second compound planetary gear set CPG2.

The structure of the transmission according to the first embodiment of the present disclosure can be constructed by connecting the rotary elements of the planetary gear sets and the friction members with the input shaft INPUT, first to seventh shafts A1 to A7, and the output shaft OUTPUT.

With reference to FIG. 1, the input shaft INPUT may be connected with the first carrier CR1 of the first planetary gear set PG1 and the second carrier CR2 of the second planetary gear set PG2 that serve in combination as the second rotary element of the first compound planetary gear set CPG1, and with a first end of the fourth clutch C4.

The first shaft A1 may be connected with the first brake B1, and the first sun gear S1 of the first planetary gear set PG1, which serves as the first rotary element of the first compound planetary gear set CPG1.

The second shaft A2 may be connected with a first end of the third clutch C3, and the first ring gear R1 of the first planetary gear set PG1, which serves as the third rotary element of the first compound planetary gear set CPG1.

The third shaft A3 may be connected with the second brake B2, a second end of the third clutch C3, and the third ring gear R3 of the third planetary gear set PG3, which serves as the third rotary element of the second compound planetary gear set CPG2.

The fourth shaft A4 may be connected with the second sun gear S2 of second planetary gear set PG2, which serves the fourth rotary element of the first compound planetary gear set CPG1, and a first end of the second clutch C2.

The fifth shaft A5 may be connected with the second ring gear R2 of the second planetary gear set PG2, which serves as the fifth rotary element of the first compound planetary gear set CPG1, and a first end of the first clutch C1.

The sixth shaft A6 may be connected with a second end of the first clutch C1, a second end of the second clutch C2, and each of the third sun gear S3 of the third planetary gear set PG3 and the fourth sun gear S4 of the fourth planetary gear set PG4, which serve in combination as the first rotary element of the second compound planetary gear set CPG2.

The seventh shaft A7 may be connected with the fourth carrier CR4 of the fourth planetary gear set PG4, which serves as the fourth rotary element of the second compound planetary gear set CPG2, and a second end of the fourth clutch C4.

The output shaft OUTPUT may be connected with the third carrier CR3 of the third planetary gear set PG3 and the fourth ring gear R4 of the fourth planetary gear set PG4, which serve in combination as the second rotary element of the second compound planetary gear set CPG2.

The transmission case CS may be connected with the first brake B1 and the second brake B2.

For example, the first brake B1 may be disconnectably connected between the first shaft A1 and the transmission case CS, the second brake B2 may be disconnectably connected between the third shaft A3 and the transmission case CS, and the first clutch C1 may be disconnectably connected between the fifth shaft A5 and the sixth shaft A6.

The second clutch C2 may be disconnectably connected between the fourth shaft A4 and the sixth shaft A6, the third clutch C3 may be disconnectably connected between the second shaft A2 and the third shaft A3, and the fourth clutch C4 may be disconnectably connected between the input shaft INPUT and the seventh shaft A7.

More specifically, the first brake B1 may be disconnectably connected between the first sun gear S1 serving as the first rotary element of the first compound planetary gear set CPG1 and the transmission case CS.

The second brake B2 may be disconnectably connected between the third ring gear R3 serving as the third rotary element of the second compound planetary gear set CPG2 and the transmission case CS.

The first clutch C1 may be disconnectably connected between the second ring gear R2 serving as the fifth rotary element of the first compound planetary gear set CPG1 and each of the third sun gear S3 and the fourth sun gear S4 that serve in combination as the first rotary element of the second compound planetary gear set CPG2.

The second clutch C2 may be disconnectably connected between the second sun gear S2 serving as the fourth rotary element of the first compound planetary gear set CPG1 and each of the third sun gear S3 and the fourth sun gear S4 that serve in combination as the first rotary element of the second compound planetary gear set CPG2.

The third clutch C3 may be disconnectably connected between the first ring gear R1 serving as the third rotary element of the first compound planetary gear set CPG1 and the third ring gear R3 serving as the third rotary element of the second compound planetary gear set CPG2.

The fourth clutch C4 may be disconnectably connected between the input shaft INPUT and the fourth carrier CR4 serving as the fourth rotary element of the second compound planetary gear set CPG2.

FIG. 3 is a table showing operation at each gear of the transmission of the first embodiment of the present disclosure, in which a first gear ratio is implemented by connecting the first clutch C1, the second clutch C2, and the second brake B2 and disconnecting the other friction members.

In order to implement a second gear ratio, the first clutch C1, the first brake B1, and the second brake B2 are connected and the other friction members are disconnected. In this way, the second gear ratio is provided. The other gear ratios corresponding to the other gear stages can be implemented through connection and disconnection of the friction members as shown in the table.

Figure 2:
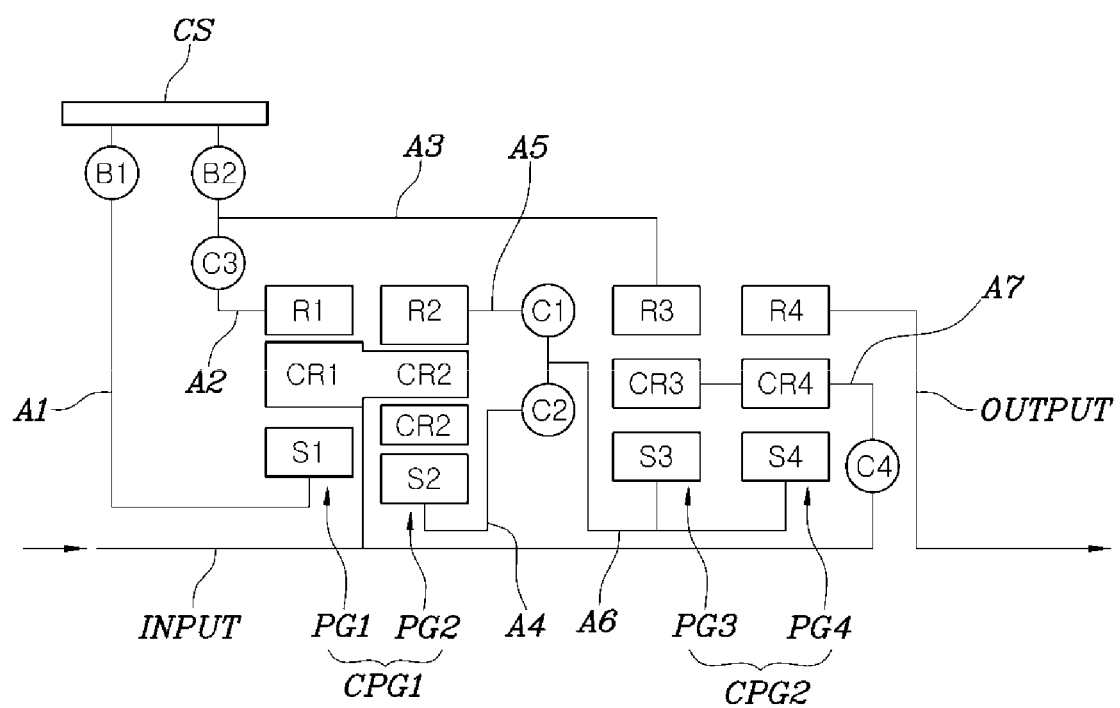
FIG. 2 is a diagram illustrating the structure of a vehicle transmission according to a second embodiment of the present disclosure.

FIG. 2 is a diagram illustrating the structure of a vehicle transmission according to a second embodiment of the present disclosure. The vehicle transmission according to the second embodiment includes a first compound planetary gear set CPG1 and a second compound planetary gear set CPG2.

The first compound planetary gear set CPG1 in the second embodiment has the same structure as the first compound planetary gear set CPG1 in the first embodiment. Therefore, a description of the first compound planetary gear set CPG1 of the second embodiment will be omitted.

Before connection relationships between the first compound planetary gear set CPG1 and the second compound planetary gear set CPG2 are described, the structure of the second compound planetary gear set CPG2 is described first. The second compound planetary gear set CPG2 is composed of two single pinion planetary gear sets that are respectively referred to as a third planetary gear set PG3 and a fourth planetary gear set PG4 herein, in which a first rotary element of the second compound planetary gear set CPG2 may be composed of a third sun gear S3 of the third planetary gear set PG3 and a fourth sun gear S4 of the fourth planetary gear set PG4, which are directly connected with each other.

A second rotary element of the second compound planetary gear set CPG2 may be a fourth ring gear R4 of the fourth planetary gear set PG4. A third rotary element of the second compound planetary gear set CPG2 may be a third ring gear R3 of the third planetary gear set PG3.

A fourth rotary element of the second compound planetary gear set CPG2 may be composed of a third carrier CR3 of the third planetary gear set PG3 and a fourth carrier CR4 of the fourth planetary gear set PG4, which are directly connected with each other.

The second rotary element of the second compound planetary gear set CPG2 may be directly connected with an output shaft OUTPUT.

For example, the fourth ring gear R4 serving as the second rotary element of the second compound planetary gear set CPG2 may be directly connected with the output shaft OUTPUT.

The third rotary element of the second compound planetary gear set CPG2 may operate selectively as a fixed element.

For example, the third ring gear R3 serving as the third rotary element of the second compound planetary gear set CPG2 may be selectively connected with a transmission case CS by a friction member.

The fourth rotary element of the second compound planetary gear set CPG2 may be selectively connected with an input shaft INPUT.

For example, the third carrier CR3 and the fourth carrier CR4 that serve in combination as the fourth rotary element of the second compound planetary gear set CPG2 may be directly connected with the input shaft INPUT by a friction member.

In the vehicle transmission structured as described above, the first planetary gear set PG1 and the second planetary gear set PG2 that serve in combination as the first compound planetary gear set CPG1, and third planetary gear set PG3 and the fourth planetary gear set PG4 that serve in combination as the second compound planetary gear set CPG2 are arranged in this order along the axial direction of the input shaft INPUT.

Specifically, the vehicle transmission according to the second embodiment may further include a plurality of friction members, each connected to at least one of the rotary elements of the compound planetary gear sets and controlling operation of the rotary element(s) connected thereto. The friction members are a first brake B1, a second brake B2, a first clutch C1, a second clutch C2, a third clutch C3, and a fourth clutch C4.

Specifically, the first brake B1 may be disconnectably connected between the first sun gear S1 serving as the first rotary element of the first compound planetary gear set CPG1 and the transmission case CS.

The second brake B2 may be disconnectably connected between the third ring gear R3 serving as the third rotary element of the second compound planetary gear set CPG2 and the transmission case CS.

The first clutch C1 may be disconnectably connected between the second ring gear R2 serving as the fifth rotary element of the first compound planetary gear set CPG1 and each of the third sun gear S3 and the fourth sun gear S4 that serve in combination as the first rotary element of the second compound planetary gear set CPG2.

The second clutch C2 may be disconnectably connected between the second sun gear S2 serving as the fourth rotary element of the first compound planetary gear set CPG1 and each of the third sun gear S3 and the fourth sun gear S4 that serve in combination as the first rotary element of the second compound planetary gear set CPG2.

The third clutch C3 may be disconnectably connected between the first ring gear R1 serving as the third rotary element of the first compound planetary gear set CPG1 and the third ring gear R3 serving as the third rotary element of the second compound planetary gear set CPG2.

The fourth clutch C4 may be disconnectably connected between the input shaft INPUT and the fourth carrier CR4 that is an element of the fourth rotary element of the second compound planetary gear set CPG2.

The vehicle transmission according to the second embodiment may be structured such that the rotary elements of each planetary gear set and the friction members are connected with the input shaft INPUT, first to seventh shafts A1 to A7, and the output shaft OUTPUT.

Referring to FIG. 2, the input shaft INPUT is connected with a first end of the fourth clutch C4, and each of the first carrier CR1 of the first planetary gear set PG1 and the second carrier CR2 of the second planetary gear set PG2, which serve in combination as the second rotary element of the first compound planetary gear set CPG1.

The first shaft A1 may be connected with the first brake B1, and the first sun gear S1 of the first planetary gear set PG1, which serves as the first rotary element of the first compound planetary gear set CPG1.

The second shaft A2 may be connected with a first end of the third clutch C3, and the first ring gear R1 of the first planetary gear set PG1, which serves as the third rotary element of the first compound planetary gear set CPG1.

The third shaft A3 may be connected with the second brake B2, a second end of the third clutch C3, and the third ring gear R3 of the third planetary gear set PG3, which serves as the third rotary element of the second compound planetary gear set CPG2.

The fourth shaft A4 may be connected with the second sun gear S2 of the second planetary gear set PG2, which serves as the fourth rotary element of the first compound planetary gear set CPG1, and a first end of second clutch C2.

The fifth shaft A5 may be connected with the second ring gear R2 of the second planetary gear set PG2, which serves as the fifth rotary element of the first compound planetary gear set CPG1, and a first end of the first clutch C1.

The sixth shaft A6 may be connected with a second end of the first clutch C1, a second end of the second clutch C2, and each of the third sun gear S3 of the third planetary gear set PG3 and the fourth sun gear S4 of the fourth planetary gear set PG4, which serve in combination as the first rotary element of the second compound planetary gear set CPG2.

The seventh shaft A7 may be connected with each of the third carrier CR3 of the third planetary gear set PG3 and the fourth carrier CR4 of the fourth planetary gear set PG4, which serve in combination as the fourth rotary element of the second compound planetary gear set CPG2, and with a second end of the fourth clutch C4.

The output shaft OUTPUT may be connected with the fourth ring gear R4 of the fourth planetary gear set PG4, which serves as the second rotary element of the second compound planetary gear set CPG2.

The first brake B1 and the second brake B2 may be connected to the transmission case CS.

For example, the first brake B1 may be disconnectably connected between the first shaft A1 and the transmission case CS, the second brake B2 may be disconnectably connected between the third shaft A3 and the transmission case CS, and the first clutch C1 may be disconnectably connected between the fifth shaft A5 and the sixth shaft A6.

The second clutch C2 may be disconnectably connected between the fourth shaft A4 and the sixth shaft A6, the third clutch C3 may be disconnectably connected between the second shaft A2 and the third shaft A3, and the fourth clutch C4 may be disconnectably connected between the input shaft INPUT and the seventh shaft A7.

More specifically, the first brake B1 may be disconnectably connected between the first sun gear S1 serving as the first rotary element of the first compound planetary gear set CPG1, and the transmission case CS.

The second brake B2 may be disconnectably connected between the third ring gear R3 serving as the third rotary element of the second compound planetary gear set CPG2, and the transmission case CS.

The first clutch C1 may be disconnectably connected between the second ring gear R2 serving as the fifth rotary element of the first compound planetary gear set CPG1 and each of the third sun gear S3 and the fourth sun gear S4 that serve in combination as the first rotary element of the second compound planetary gear set CPG2.

The second clutch C2 may be disconnectably connected between the second sun gear S2 serving as the fourth rotary element of the first compound planetary gear set CPG1 and each of the third sun gear S3 and the fourth sun gear S4 that serve in combination as the first rotary element of the second compound planetary gear set CPG2.

The third clutch C3 may be disconnectably connected between the first ring gear R1 serving as the third rotary element of the first compound planetary gear set CPG1 and the third ring gear R3 serving as the third rotary element of the second compound planetary gear set CPG2.

The fourth clutch C4 may be disconnectably connected between the input shaft INPUT and the fourth carrier CR4 that is an element of the fourth rotary element of the second compound planetary gear set CPG2.

FIG. 3 is a table showing operation at each gear stage of the vehicle transmission according to the second embodiment, in which the first clutch C1, the second clutch C2, and the second brake B2 are connected, but the other friction members are disconnected to implement a first gear ratio.

To implement a second gear ratio, the first clutch C1, the first brake B1, and the second brake B2 are connected, but the other friction members are disconnected. The friction members are connected or disconnected as shown in the operation table, thereby implementing various gear ratios.

Figure 4:
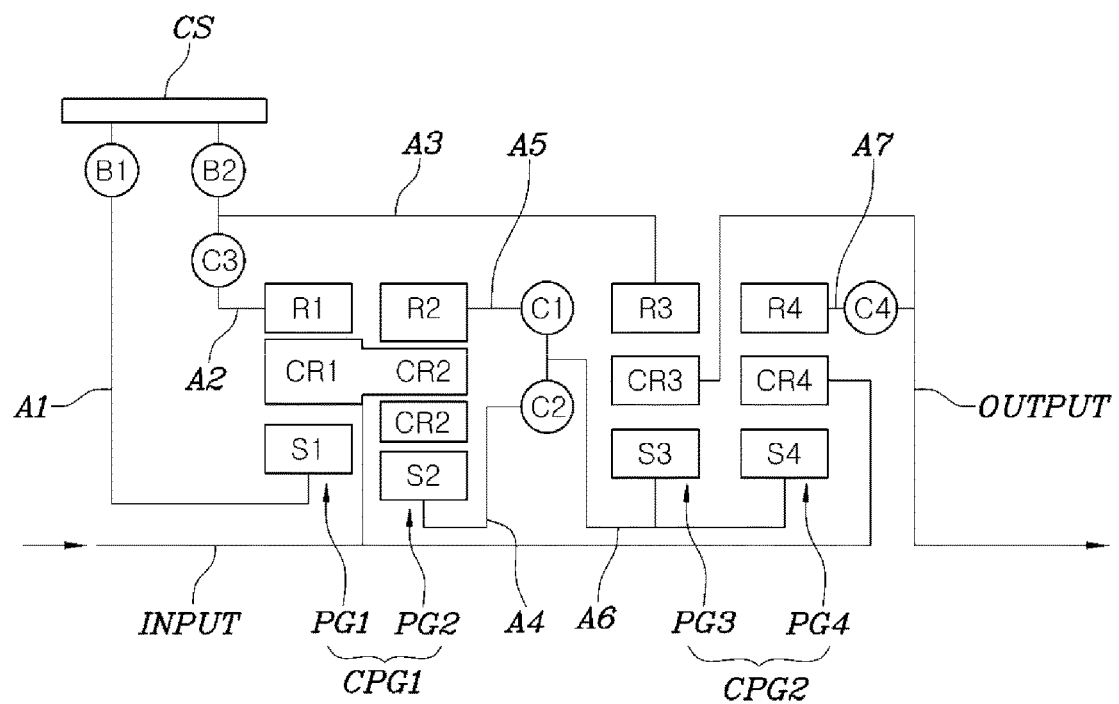
FIG. 4 is a diagram illustrating the structure of a vehicle transmission according to a third embodiment of the present disclosure.

FIG. 4 is a diagram illustrating the structure of a vehicle transmission according to a third embodiment of the present disclosure. The vehicle transmission according to the third embodiment may include a first compound planetary gear set CPG1 and a second compound planetary gear set CPG2.

The first compound planetary gear set CPG1 of this embodiment may be structured in the same way as the first compound planetary gear set CPG1 of the first embodiment. Therefore, a description thereof will be omitted.

Before describing connection relationships between the first compound planetary gear set CPG1 and the second compound planetary gear set CPG2, the structure of the second compound planetary gear set CPG2 will be first described. The second compound planetary gear set CPG2 includes two single pinion planetary gear sets respectively referred to as a third planetary gear set PG3 and a fourth planetary gear set PG4 herein. A first rotary element of the second compound planetary gear set CPG2 may include a third sun gear S3 of the third planetary gear set PG3 and a fourth sun gear S4 of the fourth planetary gear set PG4, which are directly connected with each other.

A second rotary element of the second compound planetary gear set CPG2 may be a third carrier CR3 of the third planetary gear set PG3, and a third rotary element of the second compound planetary gear set CPG2 may be a third ring gear R3 of the third planetary gear set PG3.

A fourth rotary element of the second compound planetary gear set CPG2 may be a fourth carrier CR4 of the fourth planetary gear set PG4, and a fifth rotary element of the second compound planetary gear set CPG2 may be a fourth ring gear R4 of the fourth planetary gear set PG4.

The second rotary element of the second compound planetary gear set CPG2 may be directly connected with an output shaft OUTPUT.

For example, the third carrier CR3 serving as the second rotary element of the second compound planetary gear set CPG2 may be directly connected with the output shaft OUTPUT.

The third rotary element of the second compound planetary gear set CPG2 may operate selectively as a fixed element.

For example, the third ring gear R3 serving as the third rotary element of the second compound planetary gear set CPG2 may be selectively connected with a transmission case CS by a friction member.

The fourth rotary element of the second compound planetary gear set CPG2 may be directly connected with the input shaft INPUT.

For example, the fourth carrier CR4 serving as the fourth rotary element of the second compound planetary gear set CPG2 may be directly connected with the input shaft INPUT.

The fifth rotary element of the second compound planetary gear set CPG2 may be selectively connected with the output shaft OUTPUT.

For example, the fourth ring gear R4 serving as the fifth rotary element of the second compound planetary gear set CPG2 may be selectively connected with the output shaft OUTPUT by a friction member.

In the vehicle transmission having the structure described above, the first planetary gear set PG1 and the second planetary gear set PG2 of the first compound planetary gear set CPG1, and the third planetary gear set PG3 and the fourth planetary gear set PG4 of the second compound planetary gear set CPG2 may be arranged in this order in the axial direction of the input shaft INPUT.

Specifically, the vehicle transmission according to the third embodiment may further include a plurality of friction members connected to at least one of the rotary elements of the compound planetary gear sets and controlling rotation of the rotary element(s) connected thereto. The friction members may be a first brake B1, a second brake B2, a first clutch C1, a second clutch C2, a third clutch C3, and a fourth clutch C4.

Specifically, the first brake B1 may be disconnectably connected between the first sun gear S1 serving as the first rotary element of the first compound planetary gear set CPG1, and a transmission case CS.

The second brake B2 may be disconnectably connected between the third ring gear R3 serving as the third rotary element of the second compound planetary gear set CPG2, and the transmission case CS.

The first clutch C1 may be disconnectably connected between the second ring gear R2 serving as the fifth rotary element of the first compound planetary gear set CPG1 and each of the third sun gear S3 and the fourth sun gear S4 that serve in combination as the first rotary element of the second compound planetary gear set CPG2.

The second clutch C2 may be disconnectably connected between the second sun gear S2 serving as the fourth rotary element of the first compound planetary gear set CPG1 and each of the third sun gear S3 and the fourth sun gear S4 that serve in combination as the first rotary element of the second compound planetary gear set CPG2.

The third clutch C3 may be disconnectably connected between the first ring gear R1 serving as the third rotary element of the first compound planetary gear set CPG1 and the third ring gear R3 serving as the third rotary element of the second compound planetary gear set CPG2.

The fourth clutch C4 may be disconnectably connected between the output shaft OUTPUT and the fourth ring gear R4 serving as the fifth rotary element of the second compound planetary gear set CPG2.

The vehicle transmission according to the third embodiment may be structured such that the rotary elements of the planetary gear sets and the friction members are connected with the input shaft INPUT, first to seventh shafts A1 to A7, and the output shaft OUTPUT.

Referring to FIG. 4, the input shaft INPUT may be connected with the first carrier CR1 of the first planetary gear set PG1 and the second carrier CR2 of the second planetary gear set PG2, which serve in combination as the second rotary element of the first compound planetary gear set CPG1, and with the fourth carrier CR4 of the fourth planetary gear set PG4, which serves as the fourth rotary element of the second compound planetary gear set CPG2.

The first shaft A1 may be connected with the first brake B1, and the first sun gear S1 of the first planetary gear set PG1, which serves as the first rotary element of the first compound planetary gear set CPG1.

The second shaft A2 may be connected with a first end of the third clutch C3, and the first ring gear R1 of the first planetary gear set PG1, which serves as the third rotary element of the first compound planetary gear set CPG1.

The third shaft A3 may be connected with the second brake B2, a second end of the third clutch C3, and the third ring gear R3 of the third planetary gear set PG3, which serves as the third rotary element of the second compound planetary gear set CPG2.

The fourth shaft A4 may be connected with the second sun gear S2 of the second planetary gear set PG2, which serves as the fourth rotary element of the first compound planetary gear set CPG1, and a first end of the second clutch C2.

The fifth shaft A5 may be connected with the second ring gear R2 of the second planetary gear set PG2, which serves as the fifth rotary element of the first compound planetary gear set CPG1, and a first end of the first clutch C1.

The sixth shaft A6 may be connected with a first end of the first clutch C1, a second end of the second clutch C2, and each of the third sun gear S3 of the third planetary gear set PG3 and the fourth sun gear S4 of the fourth planetary gear set PG4, which serve in combination as the first rotary element of the second compound planetary gear set CPG2.

The seventh shaft A7 may be connected with the fourth ring gear R4 of the fourth planetary gear set PG4, which serves as the fifth rotary element of the second compound planetary gear set CPG2, and a first end of the fourth clutch C4.

The output shaft OUTPUT may be connected with the third carrier CR3 of the third planetary gear set PG3, which serves as the second rotary element of the second compound planetary gear set CPG2, and a second end of the fourth clutch C4.

The first brake B1 and the second brake B2 may be connected with the transmission case CS.

For example, the first brake B1 may be disconnectably connected between the first shaft A1 and the transmission case CS, the second brake B2 may be disconnectably connected between the third shaft A3 and the transmission case CS, and the first clutch C1 may be disconnectably connected between the fifth shaft A5 and the sixth shaft A6.

The second clutch C2 may be disconnectably connected between the fourth shaft A4 and the sixth shaft A6, the third clutch C3 may be disconnectably connected between the second shaft A2 and the third shaft A3, and the fourth clutch C4 may be disconnectably connected between the output shaft OUTPUT and the seventh shaft A7.

More specifically, the first brake B1 may be disconnectably connected between the first sun gear S1 serving as the first rotary element of the first compound planetary gear set CPG1 and the transmission case CS.

The second brake B2 may be disconnectably connected between the third ring gear R3 serving as the third rotary element of the second compound planetary gear set CPG2 and the transmission case CS.

The first clutch C1 may be disconnectably connected between the second ring gear R2 serving as the fifth rotary element of the first compound planetary gear set CPG1, and each of the third sun gear S3 and the fourth sun gear S4, which serve in combination as the first rotary element of the second compound planetary gear set CPG2.

The second clutch C2 may be disconnectably connected between the second sun gear S2 serving as the fourth rotary element of the first compound planetary gear set CPG1, and each of the third sun gear S3 and the fourth sun gear S4, which serve in combination as the first rotary element of the second compound planetary gear set CPG2.

The third clutch C3 may be disconnectably connected between the first ring gear R1 serving as the third rotary element of the first compound planetary gear set CPG1 and the third ring gear R3 serving as the third rotary element of the second compound planetary gear set CPG2.

The fourth clutch C4 may be connected between the output shaft OUTPUT and the fourth ring gear R4 serving as the fifth rotary element of the second compound planetary gear set CPG2.

FIG. 5 is a table showing operation at each gear of the vehicle transmission according to the third embodiment of the present disclosure, in which a first gear ratio is implemented by connecting the first clutch C1, the second clutch C2, and the second brake B2 and disconnecting the other friction members.

A second gear ratio is implemented by connecting the first clutch C1, the first brake B1, and the second brake B2 and disconnecting the other friction members. Similarly, various gear ratios can be implemented by connecting some friction members and disconnecting the other friction members as shown in the operation table.

As described above, the vehicle transmission of the present disclosure can be constructed by combining four planetary gear sets and six friction members. In the vehicle transmission, a shifting operation is performed by changing speed and direction of rotation of gears in a manner of selectively connecting and disconnecting the rotary elements of the planetary gear sets and the friction members. The vehicle transmission can provide ten or more forward speed gear ratios and one or more reverse speed gear ratios through such a shifting operation. Therefore, the present disclosure has an effect of improving fuel economy and performance of a vehicle by implementing multiple gear stages. Furthermore, the present disclosure has an effect of improving driving comfort by using operating points in a low RPM range of an engine.

Although specific embodiments of the present disclosure have been described above, those skilled in the art would appreciate that various changes, modifications, and alternations are possible within the technical scope of the disclosure, and the changes, modifications, and alterations fall within the scope of the disclosure as defined in the appended claims.

What is claimed is:

1. A vehicle transmission, comprising:
a first compound planetary gear set and a second compound planetary gear set, each of the gear sets including four or more rotary elements, in which the first compound planetary gear set includes, as the four or more rotary elements, a first rotary element selectively connected to a transmission case, a second rotary element directly connected to an input shaft, a third rotary element selectively connected to a third rotary element of the second compound planetary gear set, a fourth rotary element selectively connected to a first rotary element of the second compound planetary gear set, and a fifth rotary element selectively connected to the first rotary element of the second compound planetary gear set, and in which the second compound planetary gear set includes, as the four or more rotary elements, a second rotary element directly connected to an output shaft, the third rotary element of the second compound planetary gear set selectively connected to the transmission case, and
a plurality of friction members, each connected with at least one of the rotary elements of the first and second compound planetary gear sets and controlling rotation of the rotary element(s) connected thereto;
wherein the second compound planetary gear set further includes a fourth rotary element selectively connected to the input shaft.

2. The vehicle transmission according to claim 1, wherein:
the first compound planetary gear set includes a first planetary gear set and a second planetary gear set that are, respectively, a single pinion planetary gear set and a double pinion planetary gear set and which share a carrier;
the first rotary element of the first compound planetary gear set is a first sun gear of the first planetary gear set;
the second rotary element of the first compound planetary gear set includes a first carrier of the first planetary gear set and a second carrier of the second planetary gear set;
the third rotary element of the first compound planetary gear set is a first ring gear of the first planetary gear set;
the fourth rotary element of the first compound planetary gear set is a second sun gear of the second planetary gear set; and
the fifth rotary element of the first compound planetary gear set is a second ring gear of the second planetary gear set.

3. The vehicle transmission according to claim 2, wherein:
the second compound planetary gear set includes a third planetary gear set and a fourth planetary gear set, each of which is a single pinion gear set;
the first rotary element of the second compound planetary gear set includes a third sun gear of the third planetary gear set and a fourth sun gear of the fourth planetary gear set, which are directly connected with each other;
the second rotary element of the second compound planetary gear set includes a third carrier of the third planetary gear set and a fourth ring gear of the fourth planetary gear set, which are directly connected with each other;
the third rotary element of the second compound planetary gear set is a third ring gear of the third planetary gear set; and
the fourth rotary element of the second compound planetary gear set is a fourth carrier of the fourth planetary gear set.

4. The vehicle transmission according to claim 2, wherein:
the second compound planetary gear set includes a third planetary gear set and a fourth planetary gear set, each of which is a single pinion gear set;
the first rotary element of the second compound planetary gear set includes a third sun gear of the third planetary gear set and a fourth sun gear of the fourth planetary gear set;
the second rotary element of the second compound planetary gear set is a fourth ring gear of the fourth planetary gear set;
the third rotary element of the second compound planetary gear set is a third ring gear of the third planetary gear set; and
the fourth rotary element of the second compound planetary gear set includes a third carrier of the third planetary gear set and a fourth carrier of the fourth planetary gear set.

5. The vehicle transmission according to claim 1, wherein the friction members include:
a first brake disposed between the first rotary element of the first compound planetary gear set and the transmission case;
a second brake disposed between the third rotary element of the second compound planetary gear set and the transmission case;
a first clutch disposed between the fifth rotary element of the first compound planetary gear set and the first rotary element of the second compound planetary gear set;
a second clutch disposed between the fourth rotary element of the first compound planetary gear set and the first rotary element of the second compound planetary gear set;
a third clutch disposed between the third rotary element of the first compound planetary gear set and the third rotary element of the second compound planetary gear set; and
a fourth clutch disposed between the input shaft and the fourth rotary element of the second compound planetary gear set.

6. The vehicle transmission according to claim 1, wherein:
the first compound planetary gear set includes a first planetary gear set and a second planetary gear set that are, respectively, a single pinion gear set and a double pinion gear set and which share a carrier;
the first rotary element of the first compound planetary gear set is a first sun gear of the first planetary gear set;
the second rotary element of the first compound planetary gear set includes a first carrier of the first planetary gear set and a second carrier of the second planetary gear set;
the third rotary element of the first compound planetary gear set is a first ring gear of the first planetary gear set;

the fourth rotary element of the first compound planetary gear set is a second sun gear of the second planetary gear set; and the fifth rotary element of the first compound planetary gear set is a second ring gear of the second planetary gear set, wherein the second compound planetary gear set includes a third planetary gear set and a fourth planetary gear set, each of which is a single pinion planetary gear set;

the first rotary element of the second compound planetary gear set includes a third sun gear of the third planetary gear set and a fourth sun gear of fourth planetary gear set, which are directly connected with each other;

the second rotary element of the second compound planetary gear set is a third carrier of the third planetary gear set;

the third rotary element of the second compound planetary gear set is a third ring gear of the third planetary gear set;

the fourth rotary element of the second compound planetary gear set is a fourth carrier of the fourth planetary gear set; and the fifth rotary element of the second compound planetary gear set is a fourth ring gear of the fourth planetary gear set.

* * * * *